(12) United States Patent
Hegerty et al.

(10) Patent No.: US 7,441,044 B2
(45) Date of Patent: Oct. 21, 2008

(54) COUNTRYTAGGING

(75) Inventors: Ian D. Hegerty, Saint Benoit (FR); Jan O. Gelin, Santa Clara, CA (US)

(73) Assignee: Overture Services, Inc., Pasadena, CA (US)

( * ) Notice: Subject to any disclaimer, the term of this patent is extended or adjusted under 35 U.S.C. 154(b) by 84 days.

(21) Appl. No.: 10/705,181

(22) Filed: Nov. 10, 2003

(65) Prior Publication Data

US 2005/0097202 A1   May 5, 2005

Related U.S. Application Data

(60) Provisional application No. 60/517,936, filed on Nov. 5, 2003.

(51) Int. Cl.
*G06F 15/173* (2006.01)
(52) U.S. Cl. .................................. 709/238; 709/241
(58) Field of Classification Search ................ 709/241, 709/238
See application file for complete search history.

(56) References Cited

U.S. PATENT DOCUMENTS

| | | | |
|---|---|---|---|
| 6,285,999 B1 * | 9/2001 | Page | 707/5 |
| 6,418,433 B1 * | 7/2002 | Chakrabarti et al. | 707/5 |
| 6,493,702 B1 * | 12/2002 | Adar et al. | 707/3 |
| 6,526,426 B1 * | 2/2003 | Lakritz | 715/536 |
| 6,598,051 B1 * | 7/2003 | Wiener et al. | 707/100 |
| 6,701,317 B1 * | 3/2004 | Wiener et al. | 707/10 |
| 6,941,321 B2 * | 9/2005 | Schuetze et al. | 707/103 R |
| 7,028,027 B1 * | 4/2006 | Zha et al. | 707/3 |
| 7,031,961 B2 * | 4/2006 | Pitkow et al. | 707/4 |
| 2002/0016786 A1 * | 2/2002 | Pitkow et al. | 707/3 |
| 2003/0074369 A1 * | 4/2003 | Schuetze et al. | 707/103 R |
| 2003/0212699 A1 * | 11/2003 | Denesuk et al. | 707/102 |
| 2005/0114484 A1 * | 5/2005 | Wilson et al. | 709/223 |

OTHER PUBLICATIONS

Berners-Lee, T., "Uniform Resource Identifiers (URI): Generic Syntax" [online], Network Working Group, Aug. 1998, [retrieved on Oct. 6, 2003]. Retrieved from the Internet: <URL: http://www.ietf.org/rfc/rfc2396.txt?number=2306>.

"Open Directory RDF Dump" [online], dmoz Open Director Project, date unknown, [retrieved on Nov. 7, 2003]. Retrieved from the Internet: <URL: http://rdf.dmoz.org>.

"Who Are We And What We Do" [online], dmoz Open Director Project, date unknown, [retrieved on Nov. 7, 2003]. Retrieved from the Internet: <URL: http://dmoz.org/help/geninfo.html>.

"American Registry for Internet Numbers" [online], ARIN Home Page, date unknown, [retrieved on Nov. 7, 2003]. Retrived from the Internet: <URL: http://www.arin.net>.

* cited by examiner

*Primary Examiner*—William C. Vaughn, Jr.
*Assistant Examiner*—Ranodhi N Serrao
(74) *Attorney, Agent, or Firm*—Seth H. Ostrow; Dreir LLP

(57) ABSTRACT

A method that iteratively determines which web pages and web sites are of interest to a particular user in accordance with that user's geographic location or country. The described embodiment of the present invention determines zero or more countrytags for each web page or site considered. The described embodiment makes two passes (iterations) to arrive at these countrytags.

19 Claims, 9 Drawing Sheets

| Site | Country Tag |
|------|-------------|
| ABC.com | US |
| ABC.fr | FR, UK |
| ABC.org | - |
| ... | ... |

Fig. 2
Country Tagging in Index

Create Country Tags

Inlinking and Outlinking

Fig. 5 Country Tagging (first iteration)

Country Tagging
(second iteration)

Site A information
Host name for site A is fr.foo.com (i.e., a global host)
- 10 links from .com
- 5 links from foo.fr
- 5 links from foo.de
- 3 links from foo.ca
- No outgoing links on this page

Extra data:
Name clues: Host name for site A is fr.foo.com --> Add 5 to fr
IP address is in US --> Add 4 to us

Vote summary for Site A:
- .com          10 points
- .fr     5+5= 10 points
- .de          5 points
- .us     0+4= 4 points
- .ca          3 points 10 global inlinks (From global domains, e.g., .com)
22 non-global inlinks (From country-specific domains)

| Tests (see Fig. 6) | | Passes test? |
|---|---|---|
| #1: nonglobal inlinks/total inlinks | = 22/32 = 68% | TRUE |
| #2: fr inlinks/non-global inlinks | =10/22 = 48% | TRUE |
| #3: fr inlinks and outlinks | =10 | TRUE |

600~

Fig. 7
Example of second iteration

Examples of US
Country Tagging

Subsite Country Tagging

COUNTRYTAGGING

CROSS REFERENCE TO RELATED APPLICATIONS

This application claims priority under 35 U.S.C. § 119(e) to U.S. patent application Ser. No. 60/517,936, filed on Nov. 5, 2003 by Hegerty et al.

BACKGROUND OF THE INVENTION

1. Field of the Invention

The present invention relates to search engines and, specifically, to a way of deciding whether a web site is of interest to people in a particular country or interest group.

2. Description of Background Art

Conventional search engines allow a user to locate data such as web pages and images by entering keywords. Such conventional search engines are used widely in Internet searches, although they can be used to search any large collection of information.

It is well-known that people in different countries and geographical locations are interested in different sub-sets of information. For example, a user in the United States who enters a search query "the Times" may be looking for information about or in the New York Times. In contrast, a user in Europe who enters the same query "the Times" may be looking for results about or in the London Times. Similarly, US and non-US users are usually looking for different result sets when they enter the query "football." US users are looking for sites about American football and many non-US users are looking for sites about what US users would call "soccer." As another example, when users in the UK enter the query "income tax" they are looking for sites about UK income tax, not US income tax.

In addition to looking for sites having information relevant to the user's country, some users are primarily interested in sites that are written in a language spoken by that user. For example, English language web sites are not usually helpful to a user who lives in a non-English speaking country and does not speak or read English.

Conventional search engines make some effort to tailor the result set they return to the geographical location or country location of the user. One technique conventionally used to determine a country associated with a web page is to determine the IP address of a server that is hosting the web page. If the server of a web page is located in a particular country, the web page is assumed to be associated with that country. This technique is not entirely effective because many web pages and sites are hosted across country borders. Moveover, aside from cross-border hosting, relying on IP addresses is neither definitive nor authorative. For example, a web page that is primarily of interest to people in the UK may be hosted in France and incorrectly identified as a French web page if only IP addresses are used to make a country determination. Similarly, reliance only on the name of a site is not always effective. For example, not all sites named fr.xxx.com are of interest to French users.

Registrar information, e.g., where the site was registered, suffers from the same problem as IP tables in that large sites are usually registered in the country of the parent country.

What is needed is an improved way determining which search results are of interest to the geographic location, country, or special interest group or a user entering a search query.

SUMMARY OF THE INVENTION

The present invention overcomes the deficiencies and limitations of conventional search engines by iteratively determining which web pages and web sites are of interest to a particular user in a particular geographic location or country.

The described embodiments of the present invention determine zero or more countrytags for each web page, site, or subsite considered. The described embodiment makes two passes (iterations) to arrive at these countrytags. It will be understood that either of these iterations can also be performed separately if so desired. A first iteration considers web pages of unknown country origin globally tagged web pages and looks at the inlinking web pages (hosts) of those pages. If several tests are met, the globally tagged hosts are determined to be "definitely tagged" for a particular country. The definitively tagged hosts are added to the set of hosts with country-specific domains to create an augmented set of hosts, which is used for the second iteration. The second iteration considers globally tagged web pages and looks at both inlinking and outlinking data to and from the augmented set of hosts. If several tests are met, the globally tagged web pages are assigned countrytags for a particular country. One or more of the iterations, in some embodiments, also considers so-called "extra data" as defined below.

Certain embodiments contain additional methods relating to determination of whether a site is US specific (and should be assigned a US countrytag) and determining countrytags for subsites of larger web sites.

The features and advantages described in this summary and the following detailed description are not all-inclusive. Many additional features and advantages will be apparent to one of ordinary skill in the art in view of the drawings, specification, and claims hereof. Moreover, it should be noted that the language used in this disclosure has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 2 shows an example of a data structure containing countrytags.

FIG. 7 shows an example of creating countrytags.

DETAILED DESCRIPTION OF PREFERRED EMBODIMENTS

Figure 1:
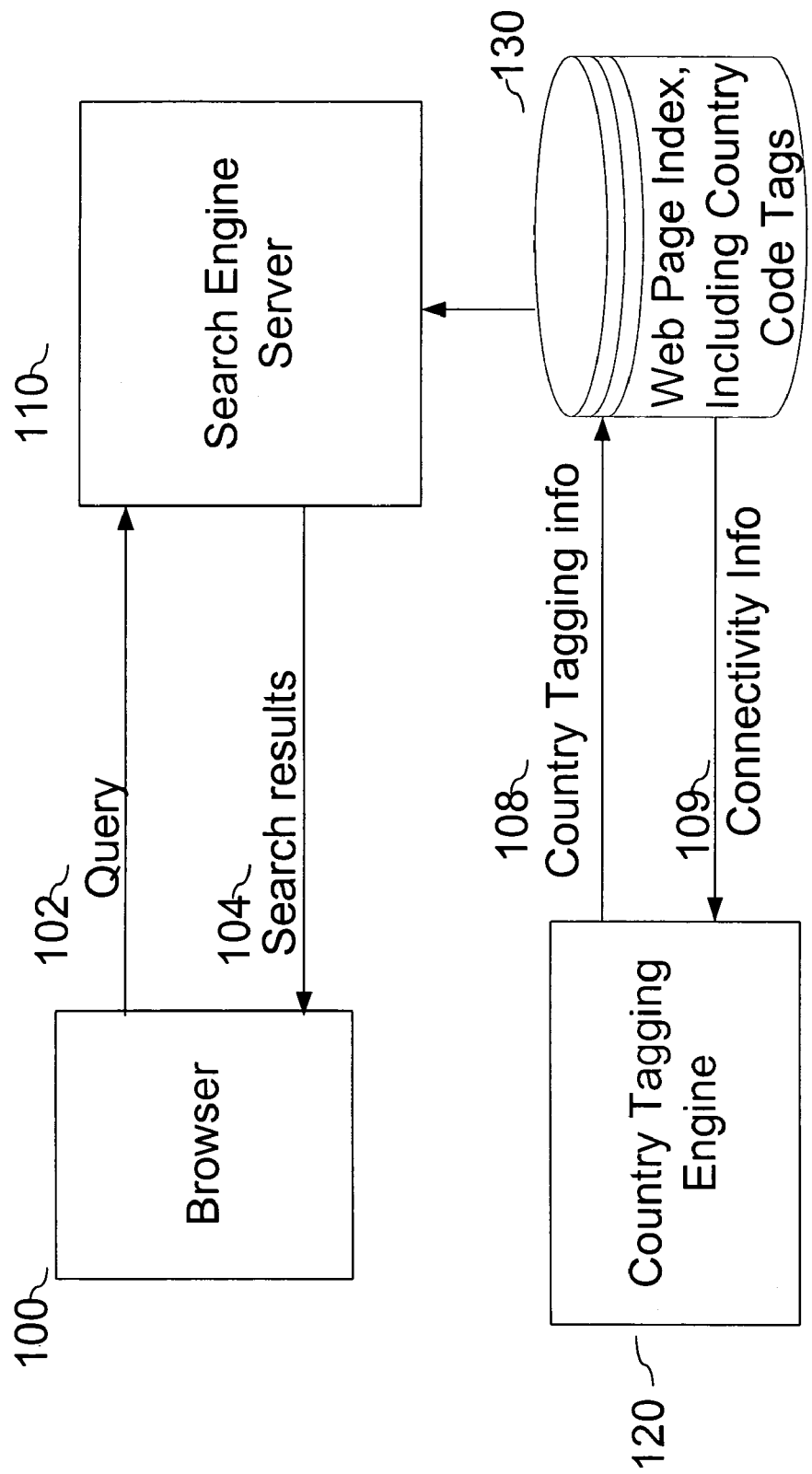
FIG. 1 is a block diagram of a search engine incorporating countrytagging in accordance with an embodiment of the present invention.

FIG. 1 is a block diagram of a search engine incorporating countrytagging in accordance with an embodiment of the present invention. Browser 100 sends a search query 102 to search engine 110. A human user preferably enters the search query, although the search query can come from any source. Search query 102 is preferably sent over a network, such as the Internet, an intranet, or a private network. Search engine 110 returns search results in accordance with the query.

In the described embodiment, the search engine has access to an index containing countrytags for some or all of the entries. As shown in FIG. 2, not all entries will have a countrytag and some may have more than one. For example, a web page or web site may not be strongly related to or of interest to a particular country. On the other hand, some entries in the index preferably will have more than one countrytag. For example a site may be of interest to both Great Britain and to France. Or a site may be of interest in two or more unrelated countries. The system, data formats and data structures shown in FIGS. 1 and 2 are shown for purposes of example only. Other appropriate systems, formats, and data structures can be used.

In FIG. 1, data is added to the index 130 by a countrytagging analysis process that is preferably performed periodically by countrytagging engine 120, in order to update the countrytags in index 130. This analysis preferably is performed every two or three months, although any appropriate periodicity can be used. Other embodiments perform the analysis process upon the occurrence of a particular event. Other embodiments perform the analysis process "on the fly" and update the index periodically. The countrytagging analysis looks at connectivity information 109 and preferably stores the results of its analysis into the index 130. Although shown as resident in the index 130, connectivity information 109 is obtained from any other appropriate source in other embodiments. As mentioned above, the analysis process and search engine can be applied to large public networks, such as the Internet, and to private or semiprivate networks, such as an enterprise network.

It will be understood that the architecture of FIG. 1 is shown for purposes of example only and that the various components shown can reside on one or more than one computers or computing systems and can be implemented as one or more than one process.

FIG. 2 shows an example of entries in index 130. In this example, two entries have countrytags (ABC.com and ABC.fr) and one entry does not have a countrytag (ABC.org). Furthermore, in the example, ABC.fr has two countrytags, since it has been deemed to be of interest to users in more than one country. Table D shows an example of rules governing which countrytags are logically connected (such as the Netherlands and Belgium). If a host is assigned a Belgium country tag, it will also get a Netherlands countrytag since those two countries are closely tied.

Figure 3:
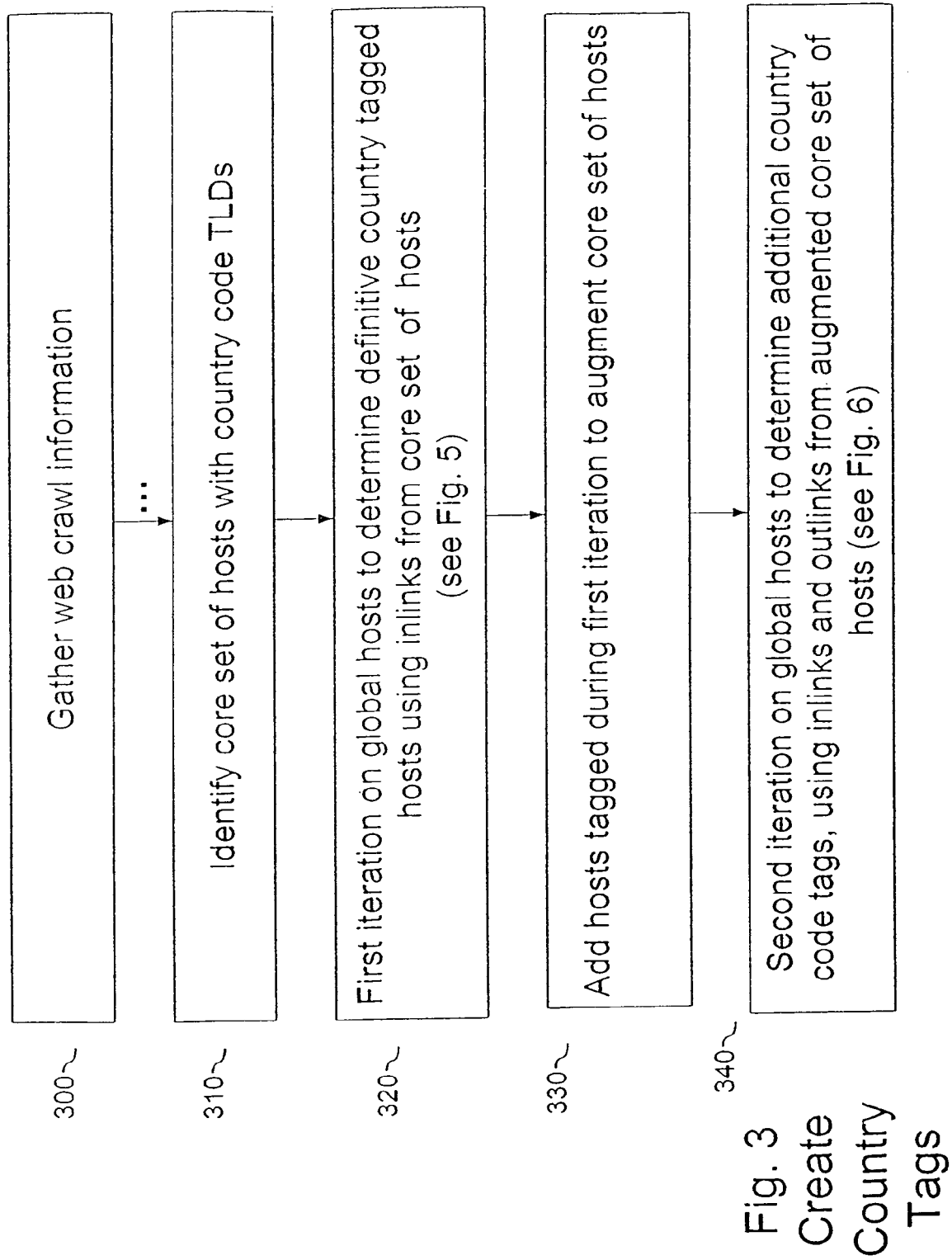
FIG. 3 is a flow chart showing a method to create countrytags.

FIG. 3 is a flow chart showing a method to create countrytags. As mentioned above, the analysis of the present invention is performed on, for example, connectivity information. This connectivity information is gathered, for example, by periodically crawling 300 the network in a manner known to persons of ordinary skill in the art.

In one embodiment, some initial cleanup is performed on the crawl results as described later. Other embodiments may not employ such cleanup procedures.

The following description of a preferred embodiment uses the term "hosts." This term is meant to be used as described in Internet Engineering Task Force (IETF) RFC 2396, which calls a "host" a "hostport." RFC 2396 is herein incorporated by reference. Thus, a host can have a URL of, for example, ABC.com or fr.ABC.com. A host can also be the web page at a specific IP address.

In the described embodiment, all hosts with country-related top-level domains are given a countrytag in the index corresponding to the top-level domain. Thus, in FIG. 2, ABC.fr will automatically be assigned a countrytag for France because it has a .fr suffix on its hostname. The exception to this rule is that certain two-character top-level domains, such as .tv are not automatically assigned a countrytag, as discussed below because they are frequently used by web sites not related to their country. In the described embodiments, countrytags are generated for the following countries: UK, IE, FR, DE, FI, SE, NO, DK, AT, CH, IT, AU, NZ, KR, BR, CA, US, ES, PT, NL, BE, and IN. Other embodiments can determine countrytags for more or fewer countries. Table F shows a listing of current country-related top-level domains.

Figure 5:
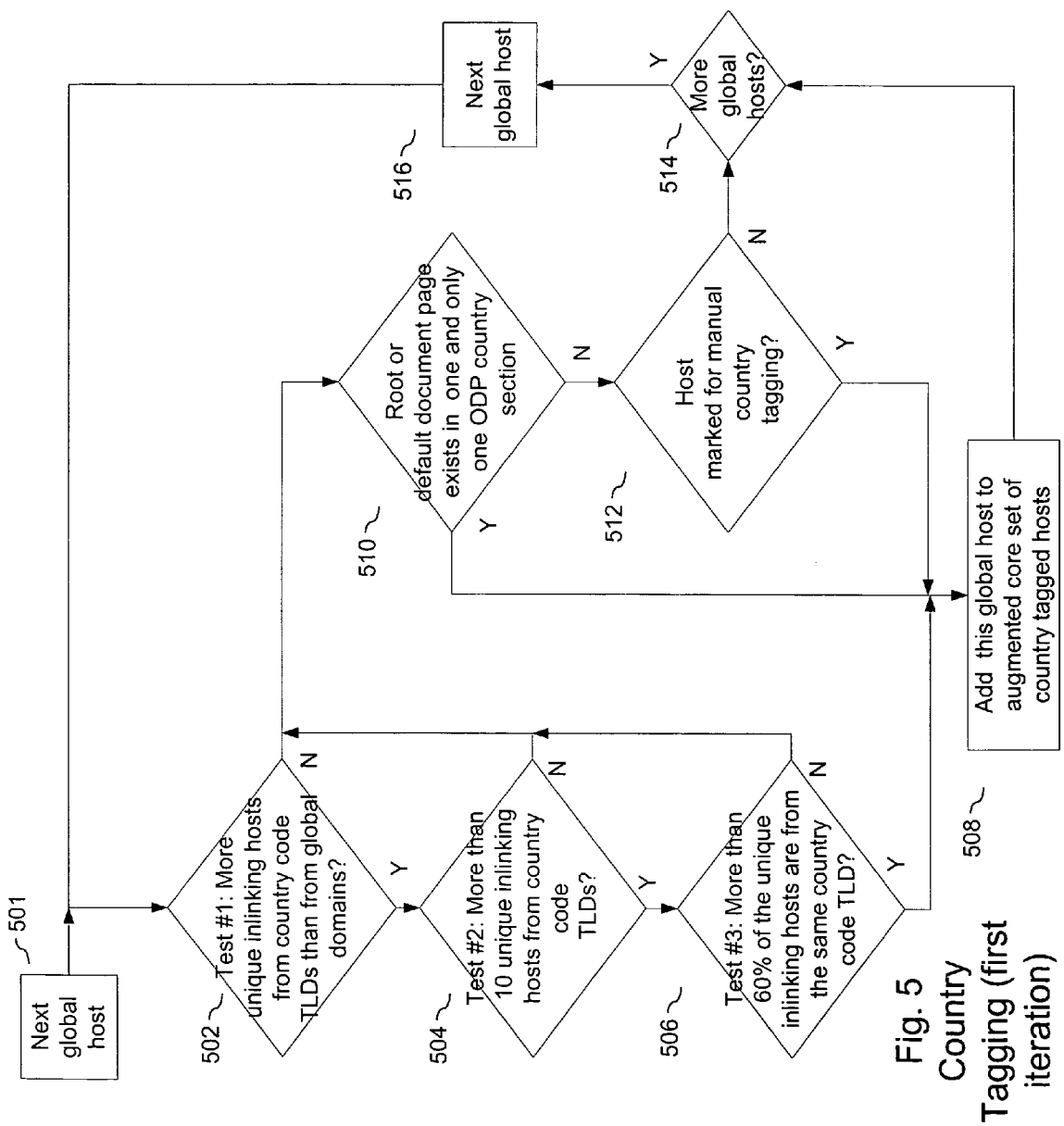
FIG. 5 is a flow chart showing details of a method to create countrytags.

A first iteration 320 is then performed on global hosts. Details of an example of this iteration are shown in FIG. 5. Global hosts are hosts whose top-level domains are not bound to one particular country. Thus, global hosts include hosts with domains such as .com, .org, and .net. Any domain that is not two characters is preferably treated as a global domain. In the described embodiment, certain two-letter top-level domains are also considered to be global domains. Certain domains are widely used by organizations in other countries because they have some visual attraction. For example, the .tv (Tuvalu) top-level domain is predominately used by television companies that are located outside of Tuvalu, and thus is considered a global domain. Some example of such domains are: TU, TO, NU, and WS. In certain embodiments these are specified in a configuration file and can be easily updated.

Hosts tagged during the first iteration 320 as specific to a particular country are added 330 to the core set of hosts, creating an augmented set of hosts. In the described embodiment, all hosts with country-related domains (such as UK, AU, IT) are initially assigned to the set of country code domain hosts to form a core set of hosts with country code top-level domains. Analysis of the inlinks and outlinks of this core set of hosts, along with additional hosts having global names (i.e., not country specific names) are used to determine countrytags for global hosts.

Figure 6:
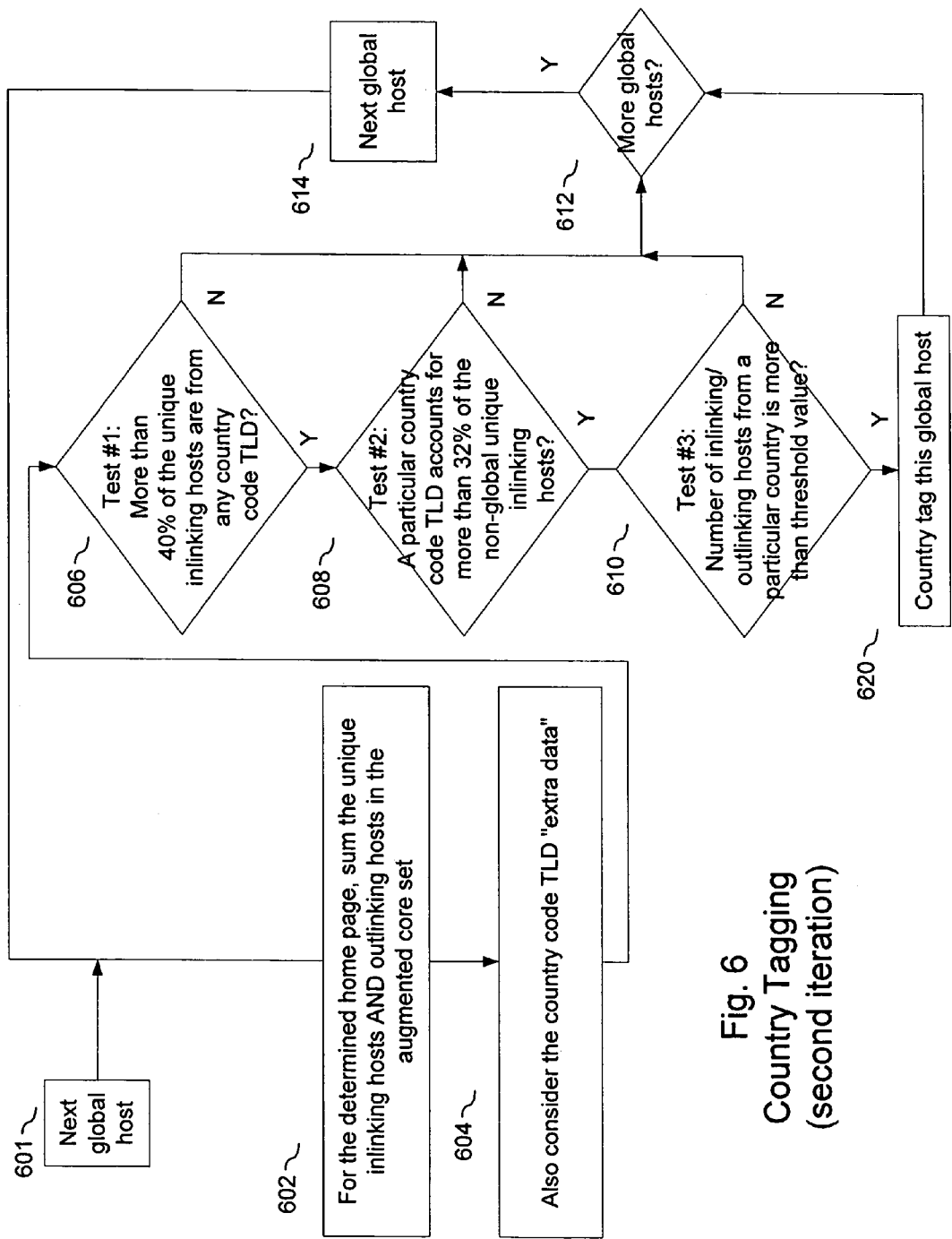
FIG. 6 is a flow chart showing details of a method to create countrytags.

Thus, while the core set of hosts are all hosts with specific country domains (UK, FR, etc.), the augmented set of hosts also contains hosts identified as country-specific during the first iteration. Use of an augmented set of hosts allows for a more accurate result, since the pool of hosts used to look at country-related connectivity information is larger for the second iteration. This augmented set of hosts is used in a second iteration 340 performed on global hosts. Details of an example of second iteration 340 are shown in FIG. 6.

Figure 4:
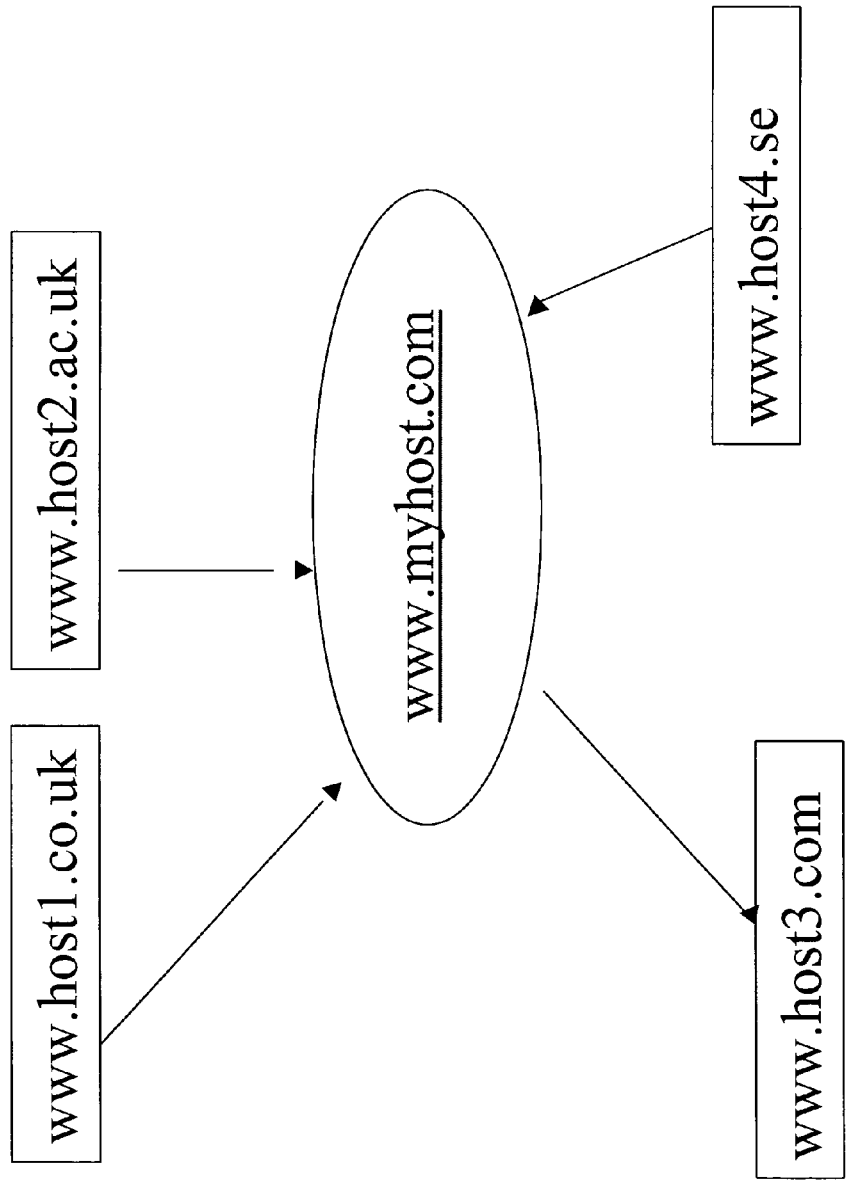
FIG. 4 shows examples of inlinking and outlinking.

FIG. 4 shows examples of inlinking and outlinking. These terms are used extensively herein. Inlinking refers to links pointing to a web page. For example, in the figure, www.host1.uk; www.host2.ac.uk; and www.host4.se point to www.myhost.com, as referenced by the arrows pointing to www.myhost.com, and thus are inlinked to that page. As a further example, www.myhost.com has an outlink to www.host3.com, as referenced by the arrow pointing away from www.myhost.com.

In the described embodiment, unique inlinking of hosts is a measure of the number of unique hosts that link to a URL, excluding links from the site itself (internal links). Unique outlinking hosts is a measure of the number of unique hosts that link from a URL, excluding links from the site itself (internal links).

FIG. 5 is a flow chart showing details of a method to determine whether certain global hosts should be treated as part of the set of country-specific hosts. This method is an example of the first iteration of FIG. 3. This iteration iterates over the connectivity database to find homepages, remove spam, and identify global host domains that are equivalent to hosts with country code top-level domains, thus creating an augmented set of hosts.

In the described embodiment, for each global host (.com, .org, etc and selected country domains such as .tv), the method determines a homepage for the host and performs a despamming operation. Then, as shown in FIG. 5, the method determines an augmented set of hosts.

Determination of a homepage for a host involves determining a "best" URL to use for the rest of the analysis. If there is only one URL on a host, that URL is used. Otherwise, every known URL of the host is examined to find a page with the lowest URL depth that has a highest unique inlinking host count. This page is used as the homepage for the rest of the analysis. URL depth is defined as:

taking the parts of the URL that follow the host and port (i.e., path—including leading slash, query, parameters, and fragment), counting the number of forward slashes, and removing one if the last forward slash is the last character of the URL, or if the string following the last forward slash is a default document page.

The term "spam" is used herein to refer to web pages that contain links for illegitimate reasons, such as increasing their standing in search engine results. Despamming is used in the described embodiment because the method works well on "natural" inlinks, so an attempt is made to remove artificial inlinks, including spam. There are three approaches:

A manual list of ODP (Open Directory Project) mirror hosts is maintained (see an example in Table E). All outlinks to or from these hosts are ignored from the countrytagging perspective (Note: the Open Directory Project is described at http://rdf.dmoz.org/ and http://dmoz.org/help/geninfo.html. The information at each of these URLs is herein incorporated by reference for the purpose of describing the ODP and its use.)

A manual list of spammers that have caused problems in the past is maintained. In particular, this list targets hosts that do "crossborder" spamming. The spam list can specify a whole host to be ignored, and hosts that inlink to a particular URL, or any hosts that outlink from a particular URL, Algorithmic despamming. Algorithmic despamming removes obvious link cliques. Any host that has preferably more than 50 inlinks to the home page is checked. The method of checking is described in the following paragraph.

Despamming:

For each host h in the connectivity database that has more than 50 links:

Create a set A of inlinking hosts to the host h.

For each host h' in A, the set of inlinking hosts to that host is created as B(h').

If more than 90% of the hosts in A and B(h') are in common, add h to the provisional spam set PS.

If the number of members in PS is 10 or greater, all hosts in PS are declared spam and ignored for countrytagging purposes.

End loop.

The above paragraphs discuss certain cleanup procedures that may be used on crawled connectivity information. Connectivity information can be obtained from other sources than a crawl. Such connectivity information may not require extensive cleanup.

Referring to FIG. 5, for each homepage of a global host, the method shown in FIG. 5 is performed. A global host is identified as "definitively countrytagged" 508 if all three of the following tests are met (the specific numbers and parameters used can vary in different embodiments):

Test #1 (502): More unique inlinking hosts are from country code top-level domains than are from global domains, Test #2 (504): More than 10 unique inlinking hosts are from country code top-level domains.)

Test #3 (506): More than 60% of the unique inlinking hosts are from the same country code top-level domain.

In the described embodiment, a host also will be countrytagged 508 if its root or default document page exists in one and only one ODP country-specific section 510.

In the described embodiment, a host will also be countrytagged 508 if the host is marked for manual countrytagging 512

If a global host is definitively countrytagged in the first iteration, it becomes part of the augmented host set used for the second iteration.

FIG. 6 is a flow chart showing details of a further method to create countrytags. This method is an example of the second iteration of FIG. 3. This iteration iterates over the connectivity database to generate countrytags for entries in the index, and uses the augmented set of hosts, as defined above, to test inlinks and outlinks to determine countrytags for global hosts.

First, for a determined home page (see above), the unique inlinking hosts and outlinking hosts in the augmented set are summed (602).

Next, "extra data" is considered (604). In the described embodiment, the extra data is considered only for the second iteration method of countrytagging as described in FIG. 6. Extra data can include Name Clues, Host Alias Tables, IP subnet information, and directory information.

When checking for Name Clues extra data, the format of the hostname is examined to see if it has any clues that indicate it might be from a particular country. For example, the domain.uk.com is an ordinary domain, but subdomains are resold, targeted at UK businesses. Similarly, many country specific hosts on global domains begin with uk. Each form of "name clue" is assigned a vote counted in number of unique inlinking hosts it is equivalent to, depending on how noisy the data is on a manual inspection. A complete list of current name clues is in Table B.

When checking host alias tables extra data, the existence of a ccTLD (country code top-level domain) in the augmented set that is an alias of a global domain host is a good indicator the owning entity does business in a country e.g.

{ www.mysite.com www.mysite.co.uk }

For every host that has a ccTLD slave, each ccTLD is assigned a vote equivalent to DEALIAS_WEIGHT unique inlinking hosts (currently 5).

When checking IP subnet information extra data, every host is DNS resolved, and the results run through IP address tables used to determine country of origin. For every host that resolves to a non-US IP address, is assigned a vote equivalent to SUBNET_WEIGHT unique inlinking hosts (currently 4).

When checking if a default page or root URL appears in the country specific ODP section, it is assigned a value equivalent to 4 unique inlinking hosts to that ccTLD.

Additionally, any default page or root URL is always tagged for the relevant country, even if it is present in multiple countries' ODP sections.

In FIG. 6, for each homepage of a global host, the method shown in FIG. 6 is performed. A global host is countrytagged 620 if all three of the following tests are met (the specific numbers and parameters used can vary in different embodiments): For each host in the connectivity database that has a global TLD.

For the determined home page, sum 602 the unique inlinking hosts AND outlinking hosts from each top-level domain in the augmented set of hosts. Add 604 the "extra data" as defined above.

Apply a countrytag if each of the following three tests are true:

Test #1 (606): More than 40% of its inlinks are from country code top-level domains in the augmented set.

Test #2 (608): A country code top-level domain in the augmented set accounts for more than 32% of the non-global unique inlinking hosts Test #3 (610): It has more than a predetermined threshold value of inlinks and outlinks from a country-code top level domain in the augmented set. This predetermined threshold value is preferably 3.

Note that multiple countrytags can be applied 620 to a given global host.

If the test is not met and the current global host is not assigned a countrytag, then control returns to 512 and 514 and the process is repeated for a next global host.

FIG. 7 shows an example of creating countrytags. This is an example of the second iteration of FIG. 6 and thus, the augmented host set has already been created. In the example, the host name for site A is fr.foo.com. Because of the .com domain, this is a global host. In the example, there are 10 inlinks from .com domains; 5 inlinks from foo.fr; 5 links from foo.de; and 3 links from foo.ca. There are no outgoing links on the homepage of site A in this example.

The extra data includes name clues. Here, the host name for the site is fr.foo.com. Because this suggests a French site, 5 points are added to FR. In the example, the IP address is in the United States. Thus 4 points are added to US.

The vote summary for site A is as follows:

| | |
|---|---|
| .com | 10 points |
| .fr | 5 + 5 = 10 points |
| .de | 5 points |
| .us | 0 + 4 = 4 points |
| .ca | 3 points |

To summarize the voting, there are 10 inlinks and outlinks from the augmented set of global names (including names in the augments core set). There are 22 non-global inlinks and outlinks.

Thus, test #1 of FIG. 6 is true since more than 40% of its inlinks are from country code top-level domains in the augmented set (here 68%).

Test #2 of FIG. 6 is true since a country code top-level domain (fr) in the augmented set accounts for more than 32% of the non-global unique inlinking hosts (here, 48%).

Test #3 of FIG. 6 is true since the homepage of site A has more than a predetermined threshold value of inlinks and outlinks from a country-code top level domain in the augmented set. This predetermined threshold value is preferably 3 and here, the value of inlinks and outlinks combined is 10.

Because all three tests of FIG. 6 are true, site A is assigned a countrytag of "FR".

Figure 8:
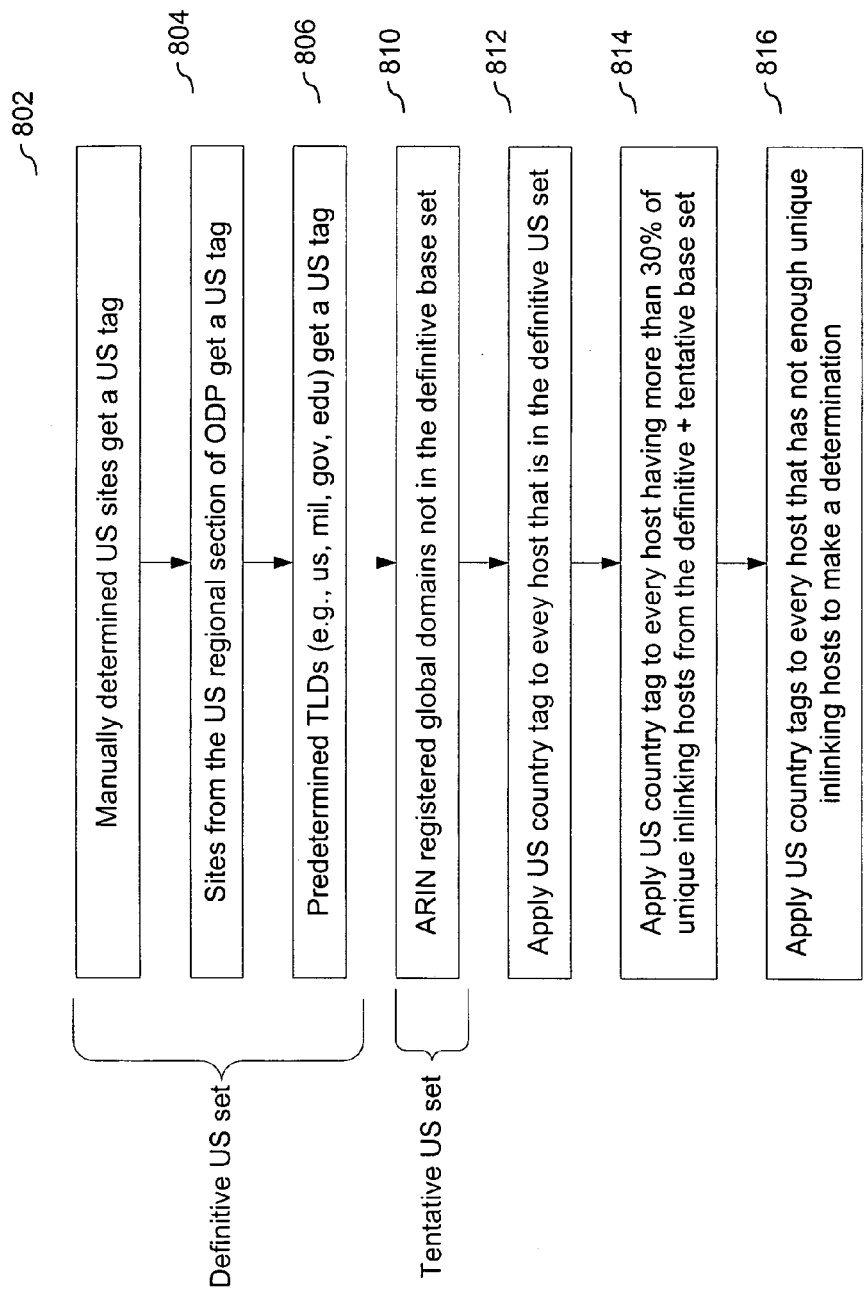
FIG. 8 is a flow chart showing a method of creating US countrytags.

FIG. 8 is a flow chart showing a method of creating US countrytags. The US host countrytagging is generated by connectivity expansion of US base set generated from TLD information, ODP information and top octet IP analysis (See Table C). The US Base set is divided into two parts: The definitive base set (see steps 802-806) and the tentative base set (see step 810).

The definitive base set will always get a US tag.

Manually determined US sites (802)

AND sites from the US regional section of ODP (804). Defined in Table A.

And US specific TLDs: .us, .mil, .gov, .edu* (806).

The tentative base set. These vote others into getting US tags, but don't necessarily get voted in themselves ARIN registered global domains not in the definitive base set (810). Global domains defined as .com, .net, .org, .info, .biz, .name, .museum, .aero, .corp, .pro, .int. ARIN stands for the American Registry of Internet Numbers and is described at, for example, http ://www.arin.net/.

The US countrytag is applied to:

Every host that is in the definitive base set (812).

AND every host that has more than 30% of unique inlinking hosts from the full base set (814).

AND every host that has not enough unique inlinking hosts to make a determination (816). This last rule exists in order to be over-inclusive rather than under-inclusive.

US countrytagging happens independently of the non-US countrytagging. i.e. a site can be in both the US index and another index.

For example * .edu are not purely US, but there are very few .edu's that are not US, so .edu is included as US countrytagged domain.

In a preferred embodiment, a user checks a box or uses some other indication on the web search page (i.e., on the front-end of the search engine) that he is interested in seeing only US countrytagged results. The contents of this checkbox is passed to the search engine through any appropriate method, such as an http parameter or a cookie. Other embodiments may place US countrytagged results first on the search results page. Other embodiments are able to determine or estimate whether the user is located in a particular country and to adjust the search results accordingly automatically.

In other embodiments, the user navigates to a particular search engine page (such as www.fr.altavista.com) to automatically see search engine results tailored for a specific country.

Figure 9:
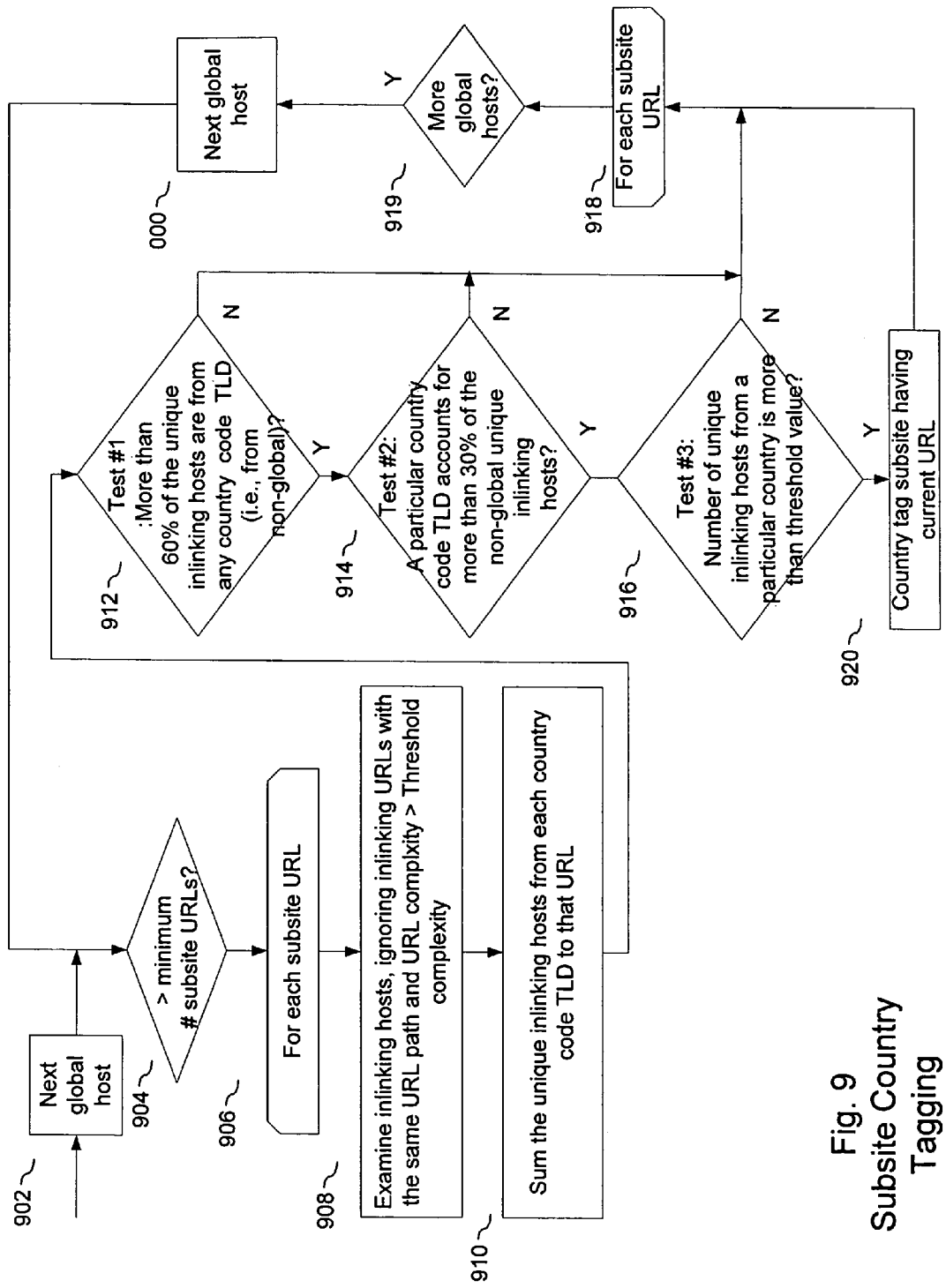
FIG. 9 is a flow chart showing a method of creating countrytags for subsites.

FIG. 9 is a flow chart showing a method of creating countrytags for subsites.

For Example, the URLs:

http://a.com/xy/index.html http://a.com/xy/b/binder.html are under the subsite http://a.com/xy/

Note: a subsite can be a single URL as well as a whole area of a host.

This method attempts to identify areas of URLs that are tied to particular countries. For example, a large computer manufacturer may have a subsite devoted primarily to UK sales within a larger site. A small number of random duplicated inlinking URLs can cause a problem here, so some deduplication takes place.

The method iterates over global hosts (902, 918, 919).

For every host with a global domain in the connectivity database that has more than MIN_URLS_FOR_SUBSITE urls (currently 10) (see step 904) examine every URL u (see 906).

For every URL u, examine inlinking hosts, ignoring inlinking URLs with the same URL path and URL complexity greater than THRESHOLD_DUPLICATE_URL_COMPLEXITY (currently 40) (see 908). An example method for determining complexity is described below.

Sum the unique inlinking hosts from each ccTLD to that URL (910), and write out the countrytags to any URL that meets each of the following three tests:

Test #1 (912) More than PERURL_MIN_NONGLOBAL_PERCENTAGE (preferably 60%) from non-global.

Test #2 (914):More than PERURL_MIN_COUNTRY_PERCENTAGE (preferably 30%) from one country, and Test #3 (916): More than PERURL_ABS_INHOSTS_THRESHHOLD (preferably 4) unique inlinking hosts from one country, If the suburl is a default document page, trim back the last forward slash, so http://a.com/uk/index.html→http://a.com/uk/ Then, all URLs beneath this path are applied a countrytag (920).

Top Octet IP Address/Regional IP Registrars

Every IP address consists of four numbers called octets. The "top octet" is the most significant, i.e. the first in dotting decimal format. So for an IP address:

A.B.C.D

A is the "top octet"

The top octet is located on a regional registrar basis. There are four major regional restrars:

ARIN (North America)
APNIC (asia Pacific)
RIPE (Europe)
LACNIC (Latin America and Caribbean)

Some top-octets allocated to single companies and organizations, some are split between different regional registrars. Breakdown is here: http://www.iana.org/assignments/ipv4-address-space ARIN is responsible for IP allocations for
North America (Canada and Mexico)
A portion of the Caribbean
Sub-equatorial Africa Root Page The root page of a host is the URL with a path or/and no other URL components; for example:

http"//<hostname>/*AbCDef/q*129876/

URL Path Complexity

Considering the "URL path" as everything after the host and port, intuitively we can guess that a very "complex" URL path is unlikely to be common. For example:

http://<hostname>/*AbCDef/q*129876/

Consequently, if we see two inlinks to a URL that both share the same URL path, and that path is very complex, we can guess that the links are not "natural"—usually this is indicative of some form of duplication.

The described embodiment uses a measure that indicates the degree of complexity of a URL path, using number of slashes, length of the path, differences in case, and number of punctuation characters, alpha, and numeric characters. This is defined as:

$i$Complexity=$i$UpperCase+$i$LowerCase+$i$Digits*2+3 *abs($i$UpperCase−$i$LowerCase)+3*$i$ Slashes+ 5*$i$OtherPunct;

Experimentally, this seems to be an effective way of detecting duplicates. Currently duplicated inlinks are ignored when they have the same URL path and the complexity is 40 or greater.

Crossborder countrytagging

A cross-border host is a cost with one ccTLD that also "belongs" in another country index. There are several reasons for crossborder sites: Country URL looks appealing in another language, e.g. www.revise.it/ (UK exam study side), www.jobboard.it/ (UK IT recruitment); ease of registration in local country (www.kso.co.uk) (DE search engine optimisation site; cross-border organizations: www.brazilianchamber.org.uk/ (Brazilian chamber of commerce in the UK); and sites in one country about another: e.g. wwwjapan-journals.co.uk, www.ireland-tourism.be/.

As these can appear to be wrong from the users perspective, we apply more stringent rules for cross-border sites.

Every host in the connectivity database with a ccTLD is examined

The host must meet the criteria to be a "definitive" countrytagged site as described below The home page must be found to be in one of the major languages for the relevant country by checking against the index.

Output Data 4.1 Intermediate Output (countryurls)

The intermediate output of the countrytagging process is a text file of ccTLD, schemelessurl pairs. Example:

| UK | uk.altavista.com/ |
| US | www.microsoft.com/ |
| UK | www.microsoft.com/uk/ |

This indicates that any URL under www.microsoft.com/ should be tagged for the US, and that any URL under www-.microsoft.com/uk/ should additionally be tagged for the UK. The file does not include entries ccTLDs that will be tagged "normally" (i.e. www.microsoft.co.uk will not be in there with a UK tag), but can include cross-border ccTLDs, eg.

DE www.kso.co.uk

Final Output

The determined countrytags can be applied to the index in order to produce filtered or country ranked results as appropriate. These are then added to the index. An example is shown in FIG. 2.

As will be understood by those familiar with the art, the invention may be embodied in other specific forms without departing from the spirit or essential characteristics thereof. For example. Accordingly, the disclosure of the present invention is intended to be illustrative, but not limiting, of the scope of the invention, which is set forth in the following claims.

TABLE B

Name Clues

```
##########################################
# nameprovider.txt
##########################################
# This specifies the hostname pattern
# that we infer tell us something about
# the country of origin of the host
##########################################
# Lines start with a pattern, a
# countrycode and a weight

# The weight gives some idea about how
# accurate we consider this and is
# estimated in terms of number of
# unique inlinking hosts as per
# the connectivity countrytagging

# The patterns either start with a ˆ
```

TABLE B-continued

Name Clues

```
# (meaning start of hostname) or
# end witha $ (meaning match at end
# of hostname). all other characters
# must match exactly!

############################################
# What we ignore

# Companies owning the xx.com/net/org
# domain

# Two letter worlds in major languages
# like to, at (au in some cases), in
# etc

# Anything whether the top results
# from AV look like they come from
# another country

# Any other ambiguities that I come
# across (Like IE –> Ireland)

# These were checked doing a
# host:es domain: ... test, and
# checking languages

# THIS LIST SHOULD BE APPLIED TO
# GLOBAL DOMAINS ONLY!

############################################
```

| | | |
|---|---|---|
| ^es. | ES | 4 |
| -es.com$ | ES | 4 |
| ^cn.com | CN | 5 |
| ^www.cn. | CN | 4 |
| -cn.com$ | CN | 4 |
| .uk.com$ | UK | 5 |
| ^uk. | UK | 4 |
| ^www.uk. | UK | 4 |
| ^in. | IN | 4 |
| india.com$ | IN | 4 |
| india.org$ | IN | 4 |
| india.net$ | IN | 4 |
| india.biz$ | IN | 4 |
| ^www.bollywood | IN | 4 |
| ^bollywood | IN | 4 |
| .uk.net$ | UK | 5 |
| -uk.com$ | | UK | 4 |
| -gb.com$ | | UK | 4 |

TABLE B-continued

Name Clues

| | | | |
|---|---|---|---|
| -uk.net$ | UK | 4 | |
| .gb.net$ | UK | 5 | |
| .gb.com$ | UK | 5 | |
| .br.com$ | BR | 5 | |
| .no.com$ | NO | 5 | |
| #^se. | SE | 4 | se is used for South East and is dangerous |
| .se.net$ | SE | 5 | |
| .se.com$ | SE | 5 | |
| ^www.fr. | FR | 5 | |
| ^fr. | FR | 4 | |
| .fr.com$ | FR | 4 | |
| -fr.com$ | FR | 4 | |
| -ca.com$ | CA | 4 | |
| -in.com$ | IN | 4 | |
| ^www.nz. | NZ | 5 | |
| ^nz. | NZ | 5 | |
| ^www.nz- | NZ | 4 | |
| ^nz- | NZ | 4 | |
| .nz.com$ | NZ | 5 | |
| -nz.com$ | NZ | 4 | |
| -nz.org$ | NZ | 4 | |
| -nz.net$ | NZ | 4 | |
| ^www.au. | AU | 4 | |
| ^au. | AU | 4 | |
| .au.com$ | AU | 5 | |
| -au.com$ | AU | 4 | |
| -au.org$ | AU | 4 | |
| -au.net$ | AU | 4 | |
| ^www.jp. | JP | 5 | |
| ^jp. | JP | 5 | |
| ^www.jp- | JP | 4 | |
| ^jp- | JP | 4 | |
| .jp.com$ | JP | 5 | |
| -jp.com$ | JP | 4 | |
| -jp.org$ | JP | 4 | |
| .jp.org$ | JP | 4 | |
| -jp.net$ | JP | 4 | |
| #.jp.net$ | JP | 4 | .jp.net is a U.S. company |
| ^www.kr. | KR | 5 | |
| ^kr. | KR | 5 | |
| ^www.kr- | KR | 4 | |
| ^kr- | KR | 4 | |
| .kr.com$ | KR | 5 | |
| -kr.com$ | KR | 4 | |
| -kr.org$ | KR | 4 | |
| -kr.net$ | KR | 4 | |

TABLE C

Definitive top-octet registrars

```
// Smaller versions so the table isn't insane
#define TO_UNK       TOP_OCTET_UNKNOWN
#define TO_ARIN      TOP_OCTET_ARIN
#define TO_RIPE      TOP_OCTET_RIPE
#define TO_APNIC     TOP_OCTET_APNIC
#define TO_LACNIC    TOP_OCTET_LACNIC
// Generated by mkregistrartable.pl
static unsigned char ucDefaultIPTable[ ]={
    TO_UNK,  TO_UNK,  TO_UNK,  TO_UNK,  TO_ARIN, TO_UNK,  TO_ARIN, TO_UNK,  /* 0 - 7 */
    TO_ARIN, TO_ARIN, TO_UNK,  TO_ARIN, TO_ARIN, TO_ARIN, TO_UNK,  TO_ARIN, /* 8 - 15 */
    TO_ARIN, TO_ARIN, TO_ARIN, TO_ARIN, TO_ARIN, TO_UNK,  TO_ARIN, TO_UNK,  /* 16 - 23 */
    TO_ARIN, TO_ARIN, TO_ARIN, TO_UNK,  TO_ARIN, TO_ARIN, TO_ARIN, TO_UNK,  /* 24 - 31 */
    TO_ARIN, TO_UNK,  TO_ARIN, TO_ARIN, TO_UNK,  TO_UNK,  TO_ARIN, TO_UNK,  /* 32 - 39 */
    TO_ARIN, TO_UNK,  TO_UNK,  TO_UNK,  TO_ARIN, TO_UNK,  TO_UNK,  TO_ARIN, /* 40 - 47 */
    TO_ARIN, TO_UNK,  TO_UNK,  TO_UNK,  TO_RIPE, TO_ARIN, TO_ARIN, TO_ARIN, /* 48 - 55 */
    TO_ARIN, TO_UNK,  TO_UNK,  TO_UNK,  TO_UNK,  TO_APNIC,TO_RIPE, TO_ARIN, /* 56 - 63 */
    TO_ARIN, TO_ARIN, TO_ARIN, TO_ARIN, TO_ARIN, TO_ARIN, TO_UNK,  TO_UNK,  /* 64 - 71 */
    TO_UNK,  TO_UNK,  TO_UNK,  TO_UNK,  TO_UNK,  TO_UNK,  TO_UNK,  TO_UNK,  /* 72 - 79 */
    TO_RIPE, TO_RIPE, TO_RIPE, TO_UNK,  TO_UNK,  TO_UNK,  TO_UNK,  TO_UNK,  /* 80 - 87 */
    TO_UNK,  TO_UNK,  TO_UNK,  TO_UNK,  TO_UNK,  TO_UNK,  TO_UNK,  TO_UNK,  /* 88 - 95 */
```

TABLE C-continued

Definitive top-octet registrars

```
TO_UNK, TO_UNK, TO_UNK, TO_UNK, TO_UNK, TO_UNK, TO_UNK, TO_UNK, /* 96 - 103 */
TO_UNK, TO_UNK, TO_UNK, TO_UNK, TO_UNK, TO_UNK, TO_UNK, TO_UNK, /* 104 - 111 */
TO_UNK, TO_UNK, TO_UNK, TO_UNK, TO_UNK, TO_UNK, TO_UNK, TO_UNK, /* 112 - 119 */
TO_UNK, TO_UNK, TO_UNK, TO_UNK, TO_UNK, TO_UNK, TO_UNK, TO_UNK, /* 120 - 127 */
TO_ARIN, TO_ARIN, TO_ARIN, TO_ARIN, TO_ARIN, TO_ARIN, TO_ARIN, TO_ARIN, /* 128 - 135 */
TO_ARIN, TO_ARIN, TO_ARIN, TO_ARIN, TO_ARIN, TO_ARIN, TO_ARIN, TO_ARIN, /* 136 - 143 */
TO_ARIN, TO_ARIN, TO_ARIN, TO_ARIN, TO_ARIN, TO_ARIN, TO_ARIN, TO_ARIN, /* 144 - 151 */
TO_ARIN, TO_ARIN, TO_ARIN, TO_ARIN, TO_ARIN, TO_ARIN, TO_ARIN, TO_ARIN, /* 152 - 159 */
TO_ARIN, TO_ARIN, TO_ARIN, TO_ARIN, TO_ARIN, TO_ARIN, TO_ARIN, TO_ARIN, /* 160 - 167 */
TO_ARIN, TO_ARIN, TO_ARIN, TO_ARIN, TO_ARIN, TO_ARIN, TO_ARIN, TO_ARIN, /* 168 - 175 */
TO_ARIN, TO_ARIN, TO_ARIN, TO_ARIN, TO_ARIN, TO_ARIN, TO_ARIN, TO_ARIN, /* 176 - 183 */
TO_ARIN, TO_ARIN, TO_ARIN, TO_ARIN, TO_ARIN, TO_ARIN, TO_ARIN, TO_ARIN, /* 184 - 191 */
TO_ARIN, TO_RIPE, TO_RIPE, TO_RIPE, TO_ARIN, TO_UNK, TO_ARIN, TO_ARIN, /* 192 - 199 */
TO_LACNIC, TO_UNK, TO_APNIC, TO_APNIC, TO_ARIN, TO_ARIN, TO_ARIN, TO_ARIN, /* 200 - 207 */
TO_ARIN, TO_ARIN, TO_APNIC, TO_APNIC, TO_RIPE, TO_RIPE, TO_ARIN, TO_ARIN, /* 208 - 215 */
TO_ARIN, TO_RIPE, TO_APNIC, TO_APNIC, TO_APNIC, TO_APNIC, TO_UNK, TO_UNK, /* 216 - 223 */
TO_UNK, TO_UNK, TO_UNK, TO UNK, TO_UNK, TO_UNK, TO_UNK, TO_UNK, /* 224 - 231 */
TO_UNK, TO_UNK, TO_UNK, TO_UNK, TO_UNK, TO_UNK, TO_UNK, TO_UNK, /* 232 - 239 */
TO_UNK, TO_UNK, TO_UNK, TO_UNK, TO_UNK, TO_UNK, TO_UNK, TO_UNK, /* 240 - 247 */
TO_UNK, TO_UNK, TO_UNK, TO_UNK, TO_UNK, TO_UNK, TO_UNK, TO_UNK/* 248 - 255 */
};
```

TABLE D

Default ccTLD Rules

Each logical index - i.e. the "index" the user sees consists of all URLs with appropriate ccTLD extensions, plus some URLs with global extensions. For some logical indexes more than one ccTLD is included. This Table lists those in the form:

<logicalindex>=<ccTLD>+
DE = DE + AT + CH        (Austria, Switzerland, Germany)
NL = NL + BE             (the Netherlands, and Belgium)
UK = UK + IE             (the UK and Ireland)

TABLE E

ODP Mirrors

```
odp-mirrors = www2.cybercafenet.com www.topsites-directory.com www.shaboo.it
odp-mirrors = www.royalcalin.com www.readersanonymous.com www.pin-outs.com
odp-mirrors = www.seekon.com www.surfer.ch www.soitfigures.com
odp-mirrors = www.shaboo.it www.royalcalin.com www.perso-xearch.com
odp-mirrors = www.pacific-mall.com www.opendir.com
www.lifestyleopportunity.org
odp-mirrors = www.kunani.com www.kineret.com www.kazazz.com
www.homepagetools.com
odp-mirrors = www.gabout.com www.flash.com.ru www.findbycategory.com
odp-mirrors = www.beguide.com www.beebware.com 192.106.194.168 206.24.4.213
odp-mirrors = dir.search.ch dir.webdsi.com dir.world-guide.com directebook.com
odp-mirrors = directory.google.co.jp directory.google.com
directory.vaionline.it
odp-mirrors = dirt.netscape.com dmoz.telekurier.at:81 hau-ab.de
odp-mirrors = hotstops.subportal.com ideas4you.net jak.subportal.com
odp-mirrors = lifestyleopportunity.org mundial.sapo.pt netz-tipp.formativ.net
odp-mirrors = northernireland.net opendir.metacrawler.com s2.dogpile.com
odp-mirrors = search.austasia.net search.hotplugins.com search.ozemu.com
# Generated from ODP Dump
odp-mirrors = subportal.iboost.com
odp-mirrors = www.searches.org
odp-mirrors = www.2trom.com
odp-mirrors = www.allsearchengines.co.uk
odp-mirrors = www.action-georgia.com
odp-mirrors = www.actionsearch.com
odp-mirrors = www.airplanes.com
odp-mirrors = www.alambina.ws
odp-mirrors = www.aldar.net
odp-mirrors = altaseek.com
odp-mirrors = aolsearch.aol.com
odp-mirrors = search.aol.com
odp-mirrors = adutopia.com
```

TABLE E-continued

ODP Mirrors odp-mirrors = www.archon.cz
odp-mirrors = www.algebrahelp.com
odp-mirrors = www.allsitesnow.com
odp-mirrors = www.allcritters.com
odp-mirrors = www.anywho.com
odp-mirrors = arachnonet.com
odp-mirrors = www.askarchie.com
odp-mirrors = homepagetools.com
odp-mirrors = www.armeniasearch.com
odp-mirrors = www.asiaobserver.com
odp-mirrors = www.att.net
odp-mirrors = www.aurki.com
odp-mirrors = www.autism-alabama.org
odp-mirrors = www.ask.com
odp-mirrors = anacondapartners.com
odp-mirrors = boggle.hypermart.net
odp-mirrors = www.be-at.de
odp-mirrors = www.be-at.com
odp-mirrors = bangkok.com
odp-mirrors = www.betterbrain.com
odp-mirrors = www.bignote.com
odp-mirrors = www.businessandlaw.com
odp-mirrors = www.bitpile.com
odp-mirrors = www.balivision.com
odp-mirrors = www.bysurf.com
odp-mirrors = www.beebz.net
odp-mirrors = www.biz.com
odp-mirrors = businessnation.com
odp-mirrors = www.biglyrics.com
odp-mirrors = www.beebware.com
odp-mirrors = www.balisurfer.com
odp-mirrors = www.big-b.co.uk
odp-mirrors = www.browseandchoose.com
odp-mirrors = www.callmenames.com
odp-mirrors = chblue.com
odp-mirrors = odp.kor.dk
odp-mirrors = www.chopstix.co.uk
odp-mirrors = collect-online.com
odp-mirrors = www.cutedoggy.com
odp-mirrors = kleer-fax.com
odp-mirrors = www.channelqueer.com
odp-mirrors = www.cybrport.net
odp-mirrors = www.dmoz.ch
odp-mirrors = www.densitron.net
odp-mirrors = www.dazzo.com
odp-mirrors = www.darkstation.com
odp-mirrors = www.dictionary.com
odp-mirrors = directhit.com
odp-mirrors = djpulse.com
odp-mirrors = www.digitalwindmill.com
odp-mirrors = www.discoverfirst.com
odp-mirrors = www.dmoz.pl
odp-mirrors = dmos.org
odp-mirrors = www.maximumedge.com
odp-mirrors = www.3apes.com
odp-mirrors = www.eeinfo.net
odp-mirrors = dirs.educationamerica.net
odp-mirrors = www.emmeffe.net
odp-mirrors = www.ExpertsAvenue.com
odp-mirrors = www.fansites.com
odp-mirrors = www.findhelpwith.com
odp-mirrors = fullwebinfo.com
odp-mirrors = www.fishhoo.com
odp-mirrors = www.fyiasia.com
odp-mirrors = geoboz.hypermart.net
odp-mirrors = globlenet.com
odp-mirrors = directory.google.com
odp-mirrors = www.gracenote.com
odp-mirrors = www.handilinks.com
odp-mirrors = www.hootingowl.com
odp-mirrors = www.holyspiritparish.com
odp-mirrors = hotbot.lycos.com
odp-mirrors = www.hitbot.co.uk
odp-mirrors = www2.humanux.com
odp-mirrors = www.inonesearch.com
odp-mirrors = www.theideaweb.com
odp-mirrors = www.idealist.com TABLE E-continued ODP Mirrors odp-mirrors = www.ignifuge.com
odp-mirrors = www.infogrid.com
odp-mirrors = www.infospace.com
odp-mirrors = internettrash.com
odp-mirrors = www.italylink.com
odp-mirrors = www.iqonline.net
odp-mirrors = www.incywincy.com
odp-mirrors = www.jaffez.com
odp-mirrors = www.jiffyseek.com
odp-mirrors = www.jrmweb.com
odp-mirrors = www.virtualpromote.com
odp-mirrors = www.kazazz.com
odp-mirrors = www.kingston-internet.net
odp-mirrors = kewlstuff4u.org
odp-mirrors = www.kabissa.org
odp-mirrors = kunani.com
odp-mirrors = www.kyndig.com
odp-mirrors = www.libdems.co.uk
odp-mirrors = www.labour-party.org.uk
odp-mirrors = www.launchbase.net
odp-mirrors = www.lehed.com
odp-mirrors = ListOfLists.com
odp-mirrors = locate.com
odp-mirrors = www.lookgood.com
odp-mirrors = www.letsfindit.net
odp-mirrors = www.linklocate.com
odp-mirrors = www.lumpini.com
odp-mirrors = www.lyrics.com
odp-mirrors = www.loquax.co.uk
odp-mirrors = www.15sl.com
odp-mirrors = dir.lycos.com
odp-mirrors = www.mediterranean.net
odp-mirrors = www.madisonfl.com
odp-mirrors = mainseek.com
odp-mirrors = map.net
odp-mirrors = www.marsnews.com
odp-mirrors = directory.megabot.net
odp-mirrors = www.metadog.com
odp-mirrors = myconnects.com
odp-mirrors = multishop.pp.ru
odp-mirrors = www.mindconnection.com
odp-mirrors = www.mygo.com
odp-mirrors = www.mailmalaysia.ws
odp-mirrors = www.mastersoflove.com
odp-mirrors = www.net1000.net
odp-mirrors = www.netrickery.com
odp-mirrors = search.netscape.com
odp-mirrors = www.netfinderusa.com
odp-mirrors = www.navysites.com
odp-mirrors = www.bvwd.com
odp-mirrors = www.netsearch.org
odp-mirrors = www.networld.com
odp-mirrors = home.nexet.net
odp-mirrors = fetch-it.hypermart.net
odp-mirrors = www.netslanding.com
odp-mirrors = www.nasdaqmania.com
odp-mirrors = dmoz.org
odp-mirrors = www.oingo.com
odp-mirrors = www.opendirectory.ca
odp-mirrors = www.opendirectory.net
odp-mirrors = www.washingtonpost.com
odp-mirrors = www.pandia.com
odp-mirrors = www.pcsnap.com
odp-mirrors = www.popularsites.com
odp-mirrors = www.pocketflier.com
odp-mirrors = www.interviews-with-poets.com
odp-mirrors = www.poisonweb.com
odp-mirrors = www.tranquileye.com
odp-mirrors = www.resourcesfortapers.com
odp-mirrors = www.scopie.com
odp-mirrors = thestomp.hypermart.net
odp-mirrors = www.scottishtories.com
odp-mirrors = www.searchbastard.com
odp-mirrors = www.searchviking.com
odp-mirrors = www.searchalot.com
odp-mirrors = www.searchbug.com
odp-mirrors = www.searchgate.co.uk TABLE E-continued ODP Mirrors odp-mirrors = www.search.ch
odp-mirrors = www.searchlord.com
odp-mirrors = www.searchshot.com
odp-mirrors = www.searchsite.org
odp-mirrors = www.seekitnow.com
odp-mirrors = sillydog.webhanger.com
odp-mirrors = www.sitewarp.com
odp-mirrors = www.smartbeak.com
odp-mirrors = www.surfershangout.com
odp-mirrors = usa.theexecutive.com
odp-mirrors = talkingafrica.szs.net
odp-mirrors = www.theenglishweb.com
odp-mirrors = theinfodepot.com
odp-mirrors = www.tnl.net
odp-mirrors = www.togglebot.com
odp-mirrors = www.tulipsandbears.com
odp-mirrors = torontonian.com
odp-mirrors = www.tutorialusa.com
odp-mirrors = www.toozen.com
odp-mirrors = www.ubetya.com
odp-mirrors = www.usefulitlinks.com
odp-mirrors = www.ultravista.com
odp-mirrors = www.rubyimage.com
odp-mirrors = www.webpath.net
odp-mirrors = www.web-search.com
odp-mirrors = www.web-source.net
odp-mirrors = www.netnormal.com
odp-mirrors = www.wizisearch.co.uk
odp-mirrors = www.wizzler.com
odp-mirrors = www.webtrawler.com
odp-mirrors = www.vivazoom.com
odp-mirrors = www.volstate.net
odp-mirrors = www.verita.com
odp-mirrors = www.vancouversearchengine.com
odp-mirrors = vla.com
odp-mirrors = members.xoom.it
odp-mirrors = www.x-mp3.com
odp-mirrors = www.xdslresource.com
odp-mirrors = yada.com
odp-mirrors = www.ace-webmaster.com
odp-mirrors = www.yourhome4.com
odp-mirrors = zahari.com
odp-mirrors = www.zensearch.com
odp-mirrors = 4australians.com
odp-mirrors = www.4topweb.com
Manual additions
odp-mirrors = directebook.com regional.trafficpimp.com s2.masrawy.com
trafficpimp.com
odp-mirrors = www.portal.brint.com www.slider.com www.spidera.com spidera.com
odp-mirrors = www.spidera.org mp3.spidera.org

TABLE F

Country-related top-level domains

.ac - Ascension Island
.ad - Andorra
.ae - United Arab Emirates
.af - Afghanistan
.ag - Antigua and Barbuda
.ai - Anguilla
.al - Albania
.am - Armenia
.an - Netherlands Antilles
.ao - Angola
.aq - Antarctica
.ar - Argentina
.as - American Samoa
.at - Austria
.au - Australia
.aw - Aruba
.az - Azerbaijan
.ba - Bosnia and Herzegovina
.bb - Barbados
.bd - Bangladesh
.be - Belgium
.bf - Burkina Faso
.bg - Bulgaria
.bh - Bahrain
.bi - Burundi
.bj - Benin
.bm - Bermuda
.bn - Brunei Darussalam
.bo - Bolivia
.br - Brazil
.bs - Bahamas
.bt - Bhutan
.bv - Bouvet Island
.bw - Botswana
.by - Belarus
.bz - Belize TABLE F-continued Country-related top-level domains .ca - Canada
.cc - Cocos (Keeling) Islands
.cd - Congo, Democratic Republic of the
.cf - Central African Republic
.cg - Congo, Republic of
.ch - Switzerland
.ci - Cote d'Ivoire
.ck - Cook Islands
.cl - Chile
.cm - Cameroon
.cn - China
.co - Colombia
.cr - Costa Rica
.cu - Cuba
.cv - Cap Verde
.cx - Christmas Island
.cy - Cyprus
.cz - Czech Republic
.de - Germany
.dj - Djibouti
.dk - Denmark
.dm - Dominica
.do - Dominican Republic
.dz - Algeria
.ec - Ecuador
.ee - Estonia
.eg - Egypt
.eh - Western Sahara
.er - Eritrea
.es - Spain
.et - Ethiopia
.fi - Finland
.fj - Fiji
.fk - Falkland Islands (Malvina)
.fm - Micronesia, Federal State of
.fo - Faroe Islands
.fr - France
.ga - Gabon
.gd - Grenada
.ge - Georgia
.gf - French Guiana
.gg - Guernsey
.gh - Ghana
.gi - Gibraltar
.gl - Greenland
.gm - Gambia
.gn - Guinea
.gp - Guadeloupe
.gq - Equatorial Guinea
.gr - Greece
.gs - South Georgia and the South Sandwich Islands
.gt - Guatemala
.gu - Guam
.gw - Guinea-Bissau
.gy - Guyana
.hk - Hong Kong
.hm - Heard and McDonald Islands
.hn - Honduras
.hr - Croatia/Hrvatska
.ht - Haiti
.hu - Hungary
.id - Indonesia
.ie - Ireland
.il - Israel
.im - Isle of Man
.in - India
.io - British Indian Ocean Territory
.iq - Iraq
.ir - Iran (Islamic Republic of)
.is - Iceland
.it - Italy
.je - Jersey
.jm - Jamaica
.jo - Jordan
.jp - Japan
.ke - Kenya
.kg - Kyrgyzstan TABLE F-continued Country-related top-level domains .kh - Cambodia
.ki - Kiribati
.km - Comoros
.kn - Saint Kitts and Nevis
.kp - Korea, Democratic People's Republic
.kr - Korea, Republic of
.kw - Kuwait
.ky - Cayman Islands
.kz - Kazakhstan
.la - Lao People's Democratic Republic
.lb - Lebanon
.lc - Saint Lucia
.li - Liechtenstein
.lk - Sri Lanka
.lr - Liberia
.ls - Lesotho
.lt - Lithuania
.lu - Luxembourg
.lv - Latvia
.ly - Libyan Arab Jamahiriya
.ma - Morocco
.mc - Monaco
.md - Moldova, Republic of
.mg - Madagascar
.mh - Marshall Islands
.mk - Macedonia, Former Yugoslav Republic
.ml - Mali
.mm - Myanmar
.mn - Mongolia
.mo - Macau
.mp - Northern Mariana Islands
.mq - Martinique
.mr - Mauritania
.ms - Montserrat
.mt - Malta
.mu - Mauritius
.mv - Maldives
.mw - Malawi
.mx - Mexico
.my - Malaysia
.mz - Mozambique
.na - Namibia
.nc - New Caledonia
.ne - Niger
.nf - Norfolk Island
.ng - Nigeria
.ni - Nicaragua
.nl - Netherlands
.no - Norway
.np - Nepal
.nr - Nauru
.nu - Niue
.nz - New Zealand
.om - Oman
.pa - Panama
.pe - Peru
.pf - French Polynesia
.pg - Papua New Guinea
.ph - Philippines
.pk - Pakistan
.pl - Poland
.pm - St. Pierre and Miquelon
.pn - Pitcairn Island
.pr - Puerto Rico
.ps - Palestinian Territories
.pt - Portugal
.pw - Palau
.py - Paraguay
.qa - Qatar
.re - Reunion Island
.ro - Romania
.ru - Russian Federation
.rw - Rwanda
.sa - Saudi Arabia
.sb - Solomon Islands
.sc - Seychelles
.sd - Sudan TABLE F-continued Country-related top-level domains .se - Sweden
.sg - Singapore
.sh - St. Helena
.si - Slovenia
.sj - Svalbard and Jan Mayen Islands
.sk - Slovak Republic
.sl - Sierra Leone
.sm - San Marino
.sn - Senegal
.so - Somalia
.sr - Suriname
.st - Sao Tome and Principe
.sv - El Salvador
.sy - Syrian Arab Republic
.sz - Swaziland
.tc - Turks and Caicos Islands
.td - Chad
.tf - French Southern Territories
.tg - Togo
.th - Thailand
.tj - Tajikistan
.tk - Tokelau
.tm - Turkmenistan
.tn - Tunisia
.to - Tonga
.tp - East Timor
.tr - Turkey
.tt - Trinidad and Tobago
.tv - Tuvalu
.tw - Taiwan
.tz - Tanzania
.ua - Ukraine
.ug - Uganda
.uk - United Kingdom
.um - US Minor Outlying Islands
.us - United States
.uy - Uruguay
.uz - Uzbekistan
.va - Holy See (City Vatican State)
.vc - Saint Vincent and the Grenadines
.ve - Venezuela
.vg - Virgin Islands (British)
.vi - Virgin Islands (USA)
.vn - Vietnam
.vu - Vanuatu
.wf - Wallis and Futuna Islands
.ws - Western Samoa
.ye - Yemen
.yt - Mayotte
.yu - Yugoslavia
.za - South Africa
.zm - Zambia
.zw - Zimbabwe

What is claimed is:

1. A method of determining a new countrytag for a website on a network, comprising:
   identifying a set of country hosts for a plurality of websites, each country host having a country-related domain;
   assigning a countrytag to each country host that corresponds to the country-related domain for the respective country host, wherein the countrytag is stored on a storage medium;
   identifying a set of global hosts for the plurality of websites, each global host not having any country-related domain;
   analyzing one or more inlinks to at least one global host from the set of global hosts to determine another countrytag for the at least one global host;
   producing an augmented set of hosts that includes the set of country hosts, the at least one global host, and the corresponding countrytags for each country host and the at least one global host;
   summing unique inlinking hosts and outlinking hosts in the augmented set;
   analyzing inlinks to the augmented set of hosts to assign the new countrytag to the at least one global host, wherein there are more than a first predetermined percentage of unique inlinking hosts from the same country-related domain, a particular country-related domain accounts for more than a second predetermined percentage of the unique inlinking hosts, and the number of inlinking hosts from a particular country is more than a predetermined threshold value.

2. The method of claim 1, wherein the country-related domain is a top-level domain.

3. The method of claim 1, further comprising:
   crawling the network to gather information about pages or sites in the network, including the top-level domain and connectivity of the crawled sites.

4. The method of claim 1, wherein the network is the Internet.

5. The method of claim 1, wherein the network is an intranet.

6. The method of claim 1, wherein said analyzing comprises analyzing one or more inlinks to at least one country host from the set of country hosts.

7. The method of claim 1, further comprising:
   analyzing inlinks to and outlinks from the at least one global host.

8. The method of claim 7, further comprising:
   adding extra points to a voting value for a country when a name of a non-global host suggests that country.

9. The method of claim 7, further comprising:
   adding extra points to a voting value for a country when an IP address of a host is in that country.

10. The method of claim 1, wherein said analyzing one or more inlinks to at least one global host from the set of global hosts to determine another countrytag for the at least one global host comprises:
    assigning another countrytag to a global host when all of the following are true: there are more unique inlinking hosts from country-related domains than from global domains, there are more than a predetermined number of unique inlinking hosts from country-related domains, and there are more than a predetermined percentage of unique inlinking hosts from the same country-related domain.

11. The method of claim 10, wherein the predetermined number is 10.

12. The method of claim 10, wherein the predetermined percentage is 60%.

13. The method of claim 1, wherein said analyzing comprises determining whether a root or default document page for the at least one global host exists in one and only one ODP country section.

14. The method of claim 1, wherein said analyzing comprises determining whether the at least one global host is marked for manual countrytagging.

15. The method of claim 1, wherein the first predetermined percentage is 40%.

16. The method of claim 1, wherein the second predetermined percentage is 32%.

17. The method of claim 1, further comprising:
    determining a countrytag for a web subsite.

18. The method of claim 1, wherein a different test is used to determine if a website should be assigned a "US" countrytag than is used for assigning countrytags of non-US countries.

19. The method of claim 1, wherein a website can be assigned more than one countrytag.

* * * * *